United States Patent
Bernstein et al.

(10) Patent No.: US 9,497,206 B2
(45) Date of Patent: Nov. 15, 2016

(54) ANOMALY DETECTION IN GROUPS OF NETWORK ADDRESSES

(71) Applicant: Cyber-Ark Software Ltd., Petach-Tikva (IL)

(72) Inventors: Ruth Bernstein, Tel-Aviv (IL); Andrey Dulkin, Herzlia (IL); Assaf Weiss, Petach-Tikva (IL); Aviram Shmueli, Tel-Aviv (IL)

(73) Assignee: Cyber-Ark Software Ltd., Petach-Tikva (IL)

( * ) Notice: Subject to any disclaimer, the term of this patent is extended or adjusted under 35 U.S.C. 154(b) by 0 days.

(21) Appl. No.: 14/253,945

(22) Filed: Apr. 16, 2014

(65) Prior Publication Data
US 2015/0304349 A1 Oct. 22, 2015

(51) Int. Cl.
*H04L 29/06* (2006.01)
(52) U.S. Cl.
CPC ....... *H04L 63/1425* (2013.01); *H04L 63/0227* (2013.01)
(58) Field of Classification Search
CPC .................. H04L 63/1425; H04L 63/0227
USPC ......................................... 726/22, 23, 24, 25
See application file for complete search history.

(56) References Cited

U.S. PATENT DOCUMENTS

| | | | |
|---|---|---|---|
| 7,103,679 B2* | 9/2006 | Bonn | ...................... H04L 41/12 370/254 |
| 8,082,349 B1 | 12/2011 | Bhargava et al. | |
| 8,082,590 B2 | 12/2011 | Kim et al. | |
| 8,429,708 B1 | 4/2013 | Tandon | |
| 8,478,708 B1 | 7/2013 | Larcom | |
| 8,701,167 B2 | 4/2014 | Kovalan | |
| 2003/0191627 A1* | 10/2003 | Au | ...................... G06F 17/2785 704/9 |
| 2005/0203881 A1 | 9/2005 | Sakamoto et al. | |
| 2006/0080410 A1* | 4/2006 | Maclarty | ................. H04L 29/06 709/220 |
| 2007/0050587 A1 | 3/2007 | Palapudi et al. | |
| 2007/0199068 A1 | 8/2007 | Russinovich et al. | |
| 2007/0204257 A1* | 8/2007 | Kinno | ..................... G06F 11/28 717/100 |

(Continued)

FOREIGN PATENT DOCUMENTS

WO    WO 2011/018736    2/2011

OTHER PUBLICATIONS

Communication Pursuant to Rules 70(2) and 70a(2) EPC and Reference to Rule 39(1) EPC Dated May 6, 2015 From the European Patent Office Re. Application No. 14190036.5.

(Continued)

*Primary Examiner* — Harunur Rashid
*Assistant Examiner* — Sakinah Taylor

(57) ABSTRACT

A method for identifying anomalies in a group of network addresses includes building a model of the group of network addresses and identifying a network address as anomalous based on the deviation of the network address from the model. The model is built from a group of network addresses. The network addresses are input and parsed into one or more address trees. A ripeness score is maintained for each of the nodes in the address trees, based, at least in part, on the number of occurrences of the network address portion represented by the node. Nodes having respective ripeness scores within a specified range are classified as ripe nodes, and may be indicative of normal behavior, and nodes having respective ripeness scores outside the specified range of ripeness scores are classified as unripe, and may be indicative of anomalous behavior.

23 Claims, 14 Drawing Sheets

(56) References Cited

U.S. PATENT DOCUMENTS

| | | | |
|---|---|---|---|
| 2007/0294187 A1* | 12/2007 | Scherrer | H04L 63/1425 705/75 |
| 2008/0034424 A1 | 2/2008 | Overcash et al. | |
| 2008/0208526 A1* | 8/2008 | Thibaux | H04L 63/1425 702/176 |
| 2008/0222706 A1 | 9/2008 | Renaud et al. | |
| 2008/0263661 A1* | 10/2008 | Bouzida | H04L 63/1416 726/22 |
| 2009/0271863 A1 | 10/2009 | Govindavajhala et al. | |
| 2009/0293121 A1 | 11/2009 | Bigus et al. | |
| 2010/0037166 A1 | 2/2010 | Chandrasekar et al. | |
| 2010/0269175 A1 | 10/2010 | Stolfo et al. | |
| 2011/0247059 A1 | 10/2011 | Anderson et al. | |
| 2013/0007883 A1 | 1/2013 | Zaitsev | |
| 2014/0033307 A1* | 1/2014 | Schmidtler | H04L 63/1483 726/22 |
| 2015/0047026 A1* | 2/2015 | Neil | H04L 63/1425 726/22 |
| 2015/0113600 A1 | 4/2015 | Dulkin et al. | |
| 2015/0121461 A1 | 4/2015 | Dulkin et al. | |
| 2015/0121518 A1 | 4/2015 | Shmueli et al. | |

OTHER PUBLICATIONS

Communication Pursuant to Rules 70(2) and 70a(2) EPC and Reference to Rule 39(1) EPC Dated Apr. 28, 2015 From the European Patent Office Re. Application No. 14187430.5.
European Search Report and the European Search Opinion Dated Mar. 3, 2015 From the European Patent Office Re. Application No. 14190036.5.
European Search Report and the European Search Opinion Dated Feb. 20, 2015 From the European Patent Office Re. Application No. 14187430.5.
Official Action Dated Jun. 17, 2015 From the US Patent and Trademark Office Re. U.S. Appl. No. 14/061,835.
Official Action Dated Jan. 21, 2015 From the US Patent and Trademark Office Re. U.S. Appl. No. 14/061,835.
Cyber-Ark "Application Identity Manager™", Cyber Ark Software, Ltd., Datasheet, 2 P. May 2010.
Cyber-Ark "Application Password Management", Cyber-Ark Software Ltd., Datasheet, 2 P., Feb. 2007.
Cyber-Ark "Enterprise Password Vault™ 4.5", Cyber-Ark Software Ltd., Brochure, 4 P., Nov. 2007.
Cyber-Ark "On-Demand Privileges Manager™ for Unix/Linux", Cyber Ark Software, Ltd., Datasheet, 2 P. May 2010.
Cyber-Ark "On-Demand Privileges Manager™ for Windows", Cyber Ark Software, Ltd., Datasheet, 2 P. May 201 0.
Cyber-Ark "On-Demand Privileges Manager™", Cyber-Ark Software Ltd., Brochure, 2 P., Apr. 2010.
Cyber-Ark "Privileged Identity Management 5.0", Cyber-Ark Software Ltd., Brochure, 4 P., Apr. 2009.
Cyber-Ark "Privileged Identity Management Suite 7.0", Cyber-Ark Software, Ltd., PIM Brocure, 4 P. May 2010.
Cyber-Ark "Privileged Session Management Suite 7.0", Cyber Ark Software, Ltd., Psm Brochure, 4 P. May 2010.
Cyber-Ark "Privileged Session Manager™", Cyber-Ark Software Ltd., Datasheet, 2 P., Mar. 2009.
Notice of Non-Compliant Amendment Dated Feb. 11, 2016 From the US Patent and Trademark Office Re. U.S. Appl. No. 14/058,254.
Official Action Dated Jan. 29, 2016 From the US Patent and Trademark Office Re. U.S. Appl. No. 14/524,145.
Official Action Dated Aug. 31, 2015 From the US Patent and Trademark Office Re. U.S. Appl. No. 14/058,254.
Applicant-Initiated Interview Summary Dated Apr. 7, 2016 From the US Patent and Trademark Office Re. U.S. Appl. No. 14/524,145.

* cited by examiner

ANOMALY DETECTION IN GROUPS OF NETWORK ADDRESSES

BACKGROUND

The present invention, in some embodiments thereof, relates to detecting anomalous network addresses in a group of network addresses, and, more specifically, but not exclusively, to detecting anomalous events in models represented by tree data structures.

Network behavior anomaly detection is an approach to network security threat detection. Anomaly detection is based on continuous monitoring of a network for unusual events or trends. Many security monitoring systems utilize a signature-based approach to detect threats. In contrast, anomaly detection monitors network characteristics, user activity and other parameters, and generates an alarm if a strange event or trend is detected that could indicate the presence of a threat. In order to effectively implement anomaly detection a model of normal activity must first be learned. Once the model is learned, new activities which are not consistent with the model may be flagged as anomalous. For example, access to or from a given network address may be considered a new activity which is analyzed for anomaly with regards to previous accesses from/to the given network address.

SUMMARY

According to an aspect of some embodiments of the present invention, a model of a group of network addresses is built by analyzing the group of network addresses. The network addresses are used to generate one or more address tree data structures. The address tree is a linked collection nodes, so that the pathway along the address tree, from root to leaf, corresponds to a given network address. A ripeness score is maintained for each node in the address tree. The ripeness score determines whether a given node is a reliable indicator for identifying normal or anomalous network addresses.

Once enough data has been collected, the address tree represents a model of the group of network addresses. Network addresses which deviate from the learned model are considered anomalous. When an anomalous network address is detected, additional actions may be triggered, for example issuing to an alert or performing further analysis to prevent false positives.

According to an aspect of some embodiments of the present invention there is provided a method for identifying anomalies in a group of network addresses. The method includes building a model of the group of network addresses and identifying a network address as anomalous based on a deviation of the network address from the model. The model is built by:

i) inputting, with a data processor, a plurality of network addresses;

ii) parsing the plurality of network addresses, with the data processor, into at least one tree data structure (also denoted an address tree). Each tree data structure includes a plurality of nodes wherein successive nodes in the tree data structure represent successive portions of a network address;

iii) during the parsing, assigning a respective ripeness score to each of the nodes, wherein the ripeness score is a number of occurrences of the node in the plurality of network addresses; and iv) classifying nodes having a respective ripeness score within a specified range of ripeness scores as ripe nodes and nodes having a respective ripeness score outside the specified range of ripeness scores as unripe.

According to some embodiments of the invention, identifying a network address as anomalous includes: traversing, with the processor, the at least one tree data structure along the network address; and classifying the network address as normal when a final node of the traversing is ripe and as anomalous when a final node of the traversing is one of an unripe node and a node outside the at least one tree data structure.

According to some embodiments of the invention, the network address is associated with at least one of: a network event and an entity.

According to some embodiments of the invention, the plurality of network addresses is ordered and the parsing is performed in the order of the network addresses.

According to some embodiments of the invention, each of the network addresses has a respective timestamp.

According to some embodiments of the invention, the method further includes triggering an alert when an anomalous network address is identified.

According to some embodiments of the invention, the method further includes: when an anomalous network address is identified, calculating an abnormality score, wherein the abnormality score is a measure of a deviation of the anomalous network address from the model, and reclassifying the identified anomalous network address as normal when the abnormality score is within a specified range.

According to some embodiments of the invention, the method further includes recalculating the abnormality score when the tree data structure includes less than specified number of leaves and wherein at least some of the leaves have respective ripeness scores greater than a specified ripeness score.

According to some embodiments of the invention, the respective ripeness score is further a function of a frequency of occurrence of the node during a specified time range.

According to some embodiments of the invention, the method further includes pruning an intermediate node by logically removing descendants of the intermediate node from the tree data structure, such that pruned node spans a sub-range of network addresses in the tree data structure, such that the pruned node becomes a leaf node in the tree data structure.

According to some embodiments of the invention, the intermediate node is pruned in accordance with at least one of: a number of descendants of the intermediate node and a depth of the intermediate node in the tree data structure.

According to some embodiments of the invention, the network addresses are associated with an entity such that the tree data structure models normal behavior for the entity, and wherein the entity is at least one of: a user, an application, a client, a device, a target machine, an account and a command.

According to some embodiments of the invention, at least one network address in the plurality of network addresses is input from one of: an agent monitoring user activity, a network element monitoring communication within the network and a list of network addresses.

According to some embodiments of the invention, the method further includes classifying a tree data structure as a mature tree when the tree data structure includes at least a specified number of ripe nodes, wherein the identifying a network address as anomalous is performed only on mature trees.

According to some embodiments of the invention, the method further includes updating the tree data structure with the specified network address by:

i) When the tree data structure includes a node representing the specified network address, incrementing respective ripeness scores of nodes traversed through the tree data structure to the node representing the specified network address; and ii) When the specified network address is outside the tree data structure, adding a node representing the specified address to the tree data structure, initializing a respective ripeness score of the added node and incrementing the respective ripeness scores of nodes traversed through the tree data structure to the added node.

According to some embodiments of the invention, the method further includes removing a network address from the tree data structure when a number of occurrences of the network address over a specified time period is less than a specified minimum number of occurrences.

According to some embodiments of the invention, each of the network addresses is an ordered sequence of symbols having a respective type, and a direction of the parsing is in accordance with the respective type.

According to some embodiments of the invention, the specified network address is one of: a destination of a data communication session and a sender of a data communication session.

According to an aspect of some embodiments of the present invention there is provided a system for identifying anomalies in a group of network addresses. The system includes a processor, a model builder module and an anomaly detection module. The model builder module:

i) Inputs network addresses;

ii) Parses the network addresses into at least one tree data structure. Each tree data structure includes a plurality of nodes wherein successive nodes in the tree data structure represent successive portions of a network address;

iii) During parsing, assigns a respective ripeness score to each of the nodes. The ripeness score is a number of occurrences of the node in the plurality of network addresses; and iv) Classifies nodes having a respective ripeness score within a specified range of ripeness scores as ripe nodes and nodes having a respective ripeness score outside the specified range of ripeness scores as unripe.

Anomaly detection module identifies a network address as anomalous or as normal based on a deviation of the network address from the model.

According to some embodiments of the invention, the anomaly detection module identifies the network address as anomalous or normal by traversing the tree data structure along the network address. The anomaly detection module classifies a network address as normal when a final node of the traversing is ripe, and as anomalous when the final node is unripe or outside the tree data structure.

According to some embodiments of the invention, the anomaly detection module triggers an alert when an anomalous network address is identified.

According to some embodiments of the invention, the system further includes an abnormality score calculation module which, when an anomalous network address is identified, calculates an abnormality score. The abnormality score is a measure of a deviation of the anomalous network address from the model. The identified anomalous network address is reclassified as normal when the abnormality score is within a specified range.

According to some embodiments of the invention, the system further includes a pruning module which prunes an intermediate node by logically removing descendants of the intermediate node from the tree data structure such that the pruned node becomes a leaf node in the tree data structure. The pruned node spans a sub-range of network addresses in the tree data structure.

According to some embodiments of the invention, the system further includes an update module which updates the tree data structure with the specified network address by:

i) when the tree data structure includes a node representing the specified network address, incrementing respective ripeness scores of nodes traversed through the tree data structure to the node representing the specified network address; and ii) when the specified network address is outside the tree data structure, adding a node representing the specified address to the tree data structure, initializing a respective ripeness score of the added node, and incrementing the respective ripeness scores of nodes traversed through the tree data structure to the added node.

According to an aspect of some embodiments of the present invention there is provided a computer program product for identifying anomalies in a group of network addresses. The computer program product includes a computer readable storage medium with program instructions embodied therewith. The program instructions are executable by a data processor to cause the processor to:

i) Input, with a data processor, a plurality of network addresses to the data processor;

ii) Build a model of the group of network addresses, with the data processor, by parsing the plurality of network addresses into at least one tree data structure, assigning a respective ripeness score to each of the nodes during the parsing and classifying nodes having a respective ripeness score within a specified range of scores as ripe nodes and nodes having a respective score outside the specified range of ripeness scores as unripe. Each tree data structure includes a plurality of nodes wherein successive nodes in the tree data structure represent successive portions of a network address. The ripeness score is a number of occurrences of the node in the plurality network addresses; and iii) Identify, with the data processor, a network address as anomalous based on a deviation of the network address from the model.

According to some embodiments of the invention, the program instructions executable by the data processor cause the processor to perform the identifying by:

i) Receiving, from an element of the network, a specified network address for classification as normal or anomalous;

ii) Traversing the at least one tree data structure, with the data processor, along the specified network address; and iii) Classifying, with the data processor, the specified network address as normal when a final node of the traversing is ripe and as anomalous when a final node of the traversing is one of an unripe node and a node outside the at least one tree data structure.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1A:
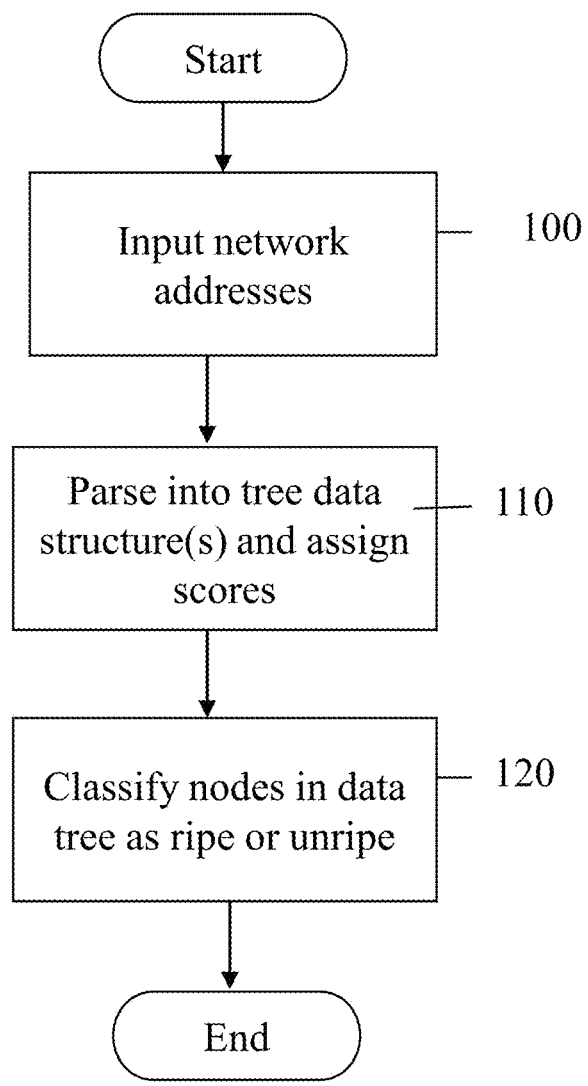
FIG. 1A is a simplified flowchart of a method for learning a model of normal behavior in a network, according to embodiments of the present invention.

The present invention, in some embodiments thereof, relates to detecting anomalous network addresses in a group of network addresses, and, more specifically, but not exclusively, to detecting anomalous events in models represented by tree data structures.

The embodiments herein build a model of normal behavior in the network by analyzing a group of network addresses. The network addresses may be associated with network events. The model is learned by building a tree data structure (denoted herein an address tree) from the network addresses. A ripeness score is maintained for each node in the address tree. The ripeness score is used to determine if enough data has been gathered to determine that the node is consistent with normal behavior. This type of node is denoted a ripe node. The collection of ripe nodes in the address tree represents a model of normal behavior. Network addresses which deviate from the learned model indicate anomalous behavior. When anomalous behavior is detected additional actions may be triggered, for example issuing to an alert or performing further analysis to prevent false positives.

As used herein the phrase "normal behavior" means behavior that is compatible with the model represented by the current address tree structure and other data associated with the current address tree. "Normal behavior" serves as a basis for anomaly detection, since an anomaly is a deviation from normal behavior.

As used herein the term "event" means an activity in network which is connected in an identifiable manner with a network address. Examples of events include communication between a source network address to a destination network address, attempt to log on to a network from a network address, actions originating from a network address, auditing records containing network addresses, lists of network addresses compiled manually and/or automatically, etc.

In some embodiments, network addresses are associated with one or more respective entities. When the address tree is parsed from network addresses associated with a particular entity, the address tree profile models normal behavior for that entity. Exemplary entities include: a user, an application, a client, device, a target machine, an account or a command. For example, a network address may describe the address of the machine in the network from which a specific user communicates. Another example is a network address that indicates the target of communication of a specific application.

In some embodiments, the network address is associated with an entity. The association may be tied to a specific event. For example, consider an audit record showing the target machine address of a specific executed commend. The audit record is an event, the target machine address is the network address and the specific command is the entity. In a subsequent audit record, it is possible that the network address will be associated with a different entity, for example if a different command is executed. Another example is a communication session between a user and a target server. The event may be the session, the network addresses are the network addresses of the user and the server, and the entities are user and target server. It is possible that in a different event, the same network address will be assigned to a different user, in which case the network address is associated with the different user for the event.

Another example of the association of network addresses with entities is that of Dynamic Host Configuration Protocol (DHCP) logs. In DHCP logs there exists a mapping between network addresses and the machines these network addresses have been assigned to. (The machines are represented by their host names and MAC addresses.) A timestamp, including the data and time, is also associated with each log record. Optionally these log records are processed to identify anomalies in the network address list, taking into consideration the absolute or relative times determined from the timestamp.

In some embodiments a separate address tree is built for each entity. In some embodiments an address tree is built from network addresses of multiple entities. For example, a single address tree may be built for all users from a given department in an organization. During anomaly detection, a given network address may be compared to the address tree of the associated entity and/or to address trees associated with one or more different entities.

In some embodiments, normal behavior for a given case or cases (e.g. a specific user) is further determined by limiting the address tree to specified attributes or groups of attributes, such as the time and/or an entity with which the network address is associated. For example, the "normal behavior" may be specific to a given user accessing a specified target network address from a fixed IP address. In another example, normal behavior relates to series of commands executed to a specified target network address (such as a URL), and may include considerations specific to the target network address such as the timing of the commands.

One of the challenges in anomaly detection is reducing the number of false positives, wherein a false positive is an erroneous identification of normal behavior (e.g. a normal action and/or network address) as an anomaly. Embodiments herein optionally deal with this challenge using several mechanisms. Optionally, the model takes into account the proximity of normal addresses and density of proximate addresses. Using these qualities, normal addresses may be grouped together and generalized such that normal network address ranges are learned. False positive rate may also be reduced by continuously updating the model which thus dynamically learns new benign behaviors.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1A which is a simplified flowchart of a method of learning a model of normal behavior in a network, according to embodiments of the present invention.

The network address may be expressed in any protocol or format known in the art which is suitable for representing in a tree structure.

For simplicity, some examples of network addresses are presented in decimal IPv4 address format. However, the embodiments herein are not limited to a specific representation of a network address. Any suitable type of address protocol (e.g. IPv4, IPv6 and domain names) and type of representation (e.g. decimal, binary, hexadecimal and alphabetical) may be used.

Learning Normal Behavior

In 100-120 the model of normal behavior is learned. As described for embodiments herein the model is represented by one or more tree data structures.

In 100 multiple network addresses are input. These network addresses are parsed into one or more address trees in 110.

The network addresses may be obtained by any means known in the art, such as:

a) A history of network activity (for example by retrieval from a log or archive);

b) Monitoring user activity with an agent;

c) Monitoring communications in the network to identify network addresses, such as source and/or destination addresses. Monitoring may be performed by network elements such as a router, network sniffer or probe; and d) Receiving a list of network addresses from any source, either automatic or manual.

In 110 the network addresses are parsed into an address tree. The address tree is hierarchical tree data structure, with a root value and sub-trees of children, represented as a set of linked nodes.

Each node in the tree represents a symbol or group of symbols in a network address. Intermediate nodes in the tree represent portions of the network address. For example, when the network addresses is an IP address, the root of the tree may represent the leftmost IP digit, an intermediate node may represent an intermediate digit in the IP address, and a leaf may represent the rightmost IP digit. The root and intermediate nodes span respective ranges of IP addresses whereas a leaf denotes a single respective IP address.

Each node in the address tree has a respective ripeness score which is used to determine node ripeness as described herein. An exemplary node with multiple attributes is presented below (see FIG. 7B).

Figure 2A:
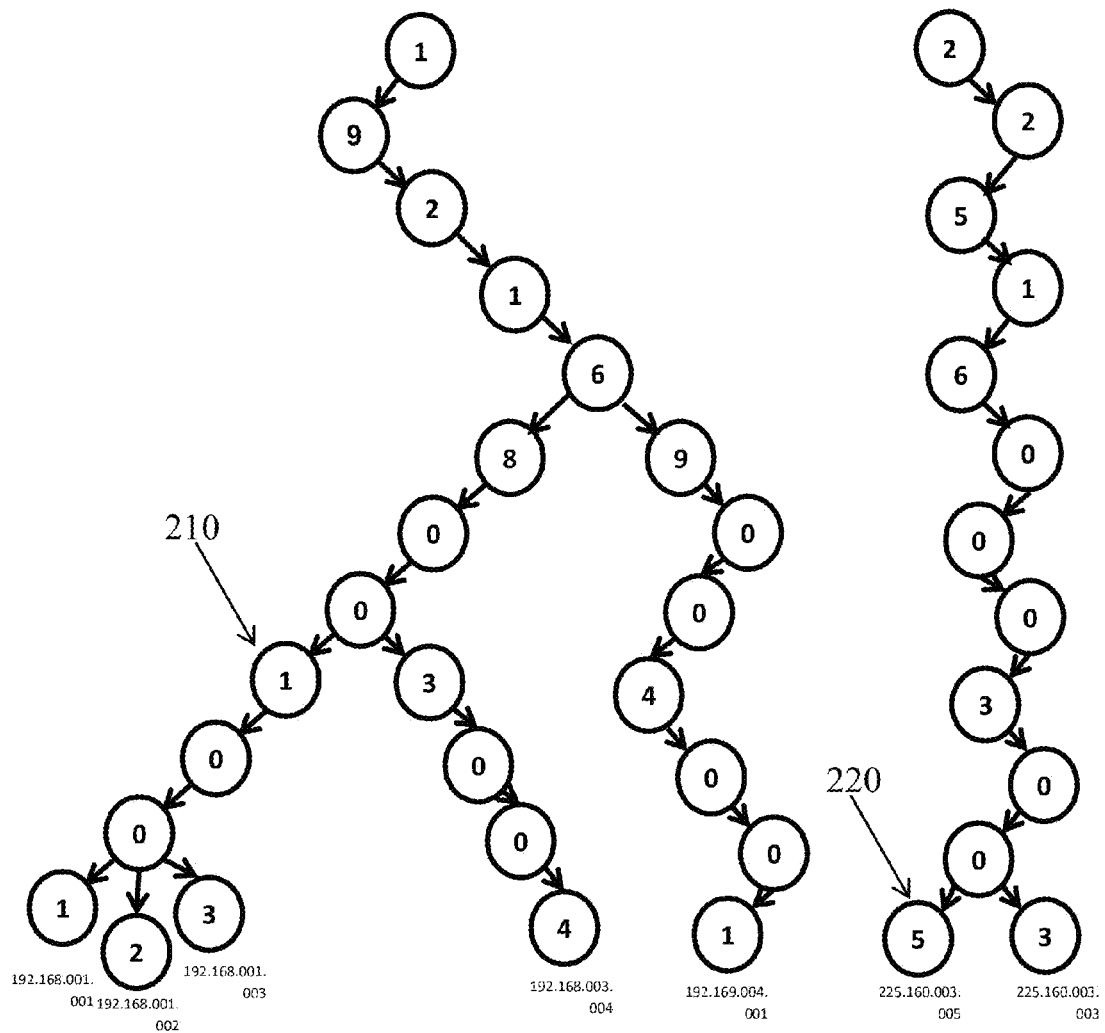
FIGS. 2A-2C show address trees parsed from an exemplary group of IP addresses.
Figure 2B:
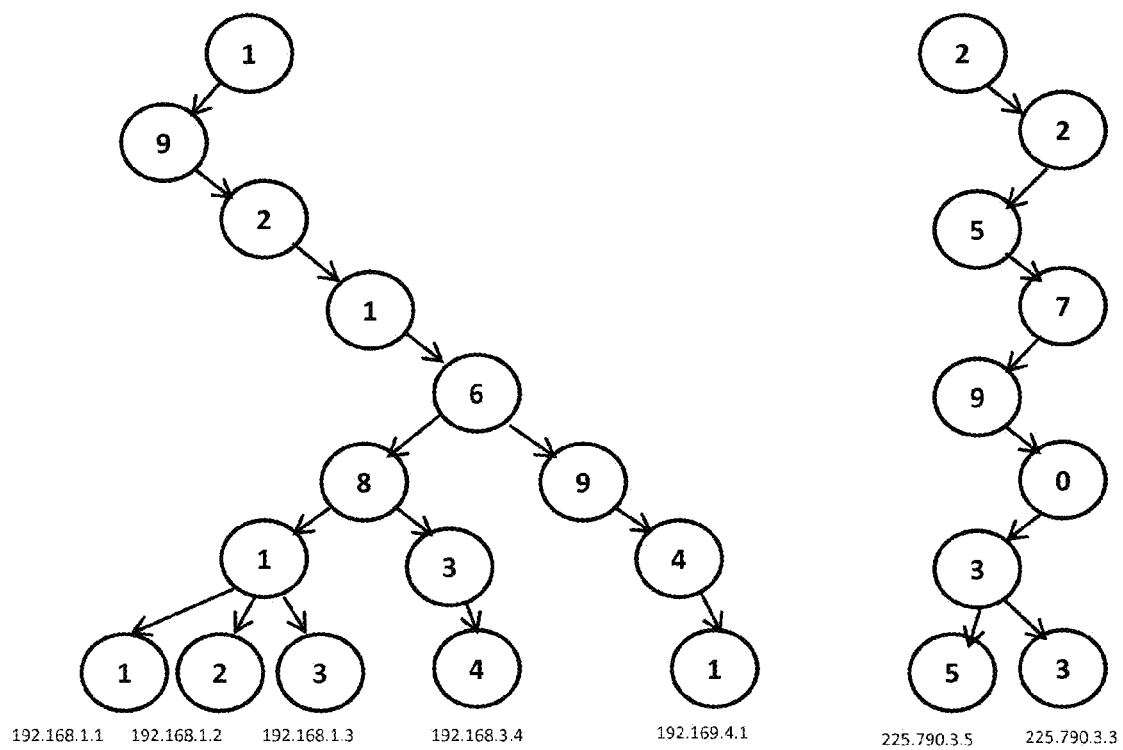
Figure 2C:
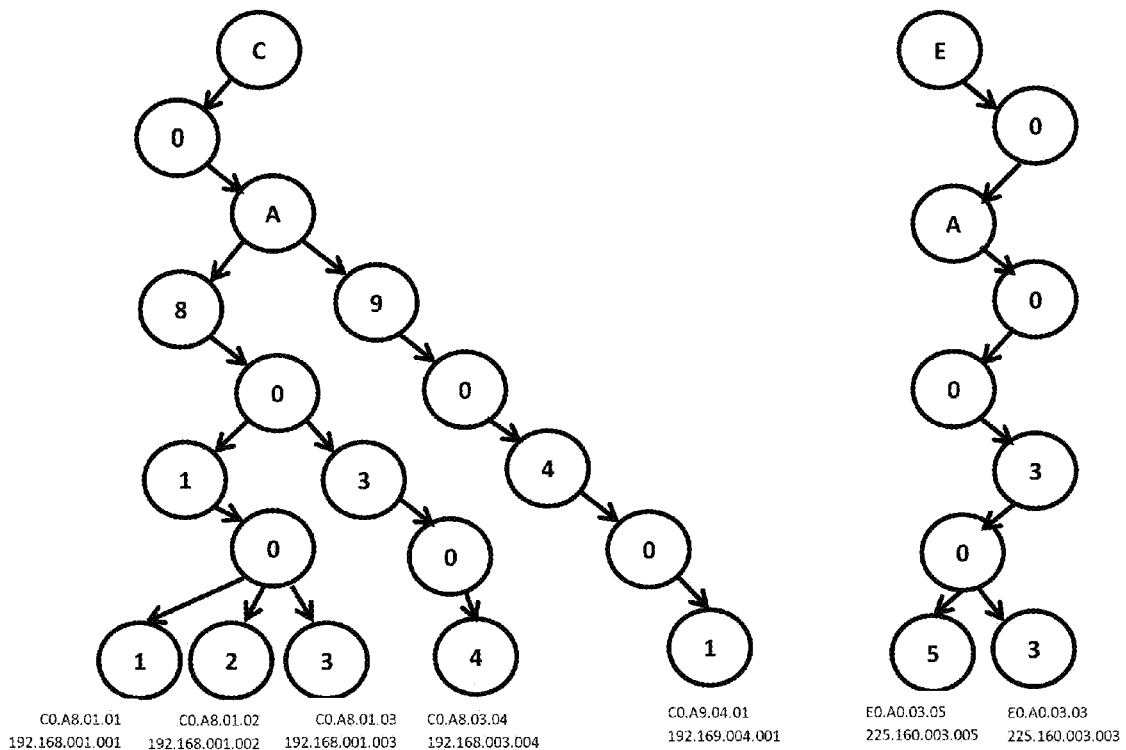
Figure 3:
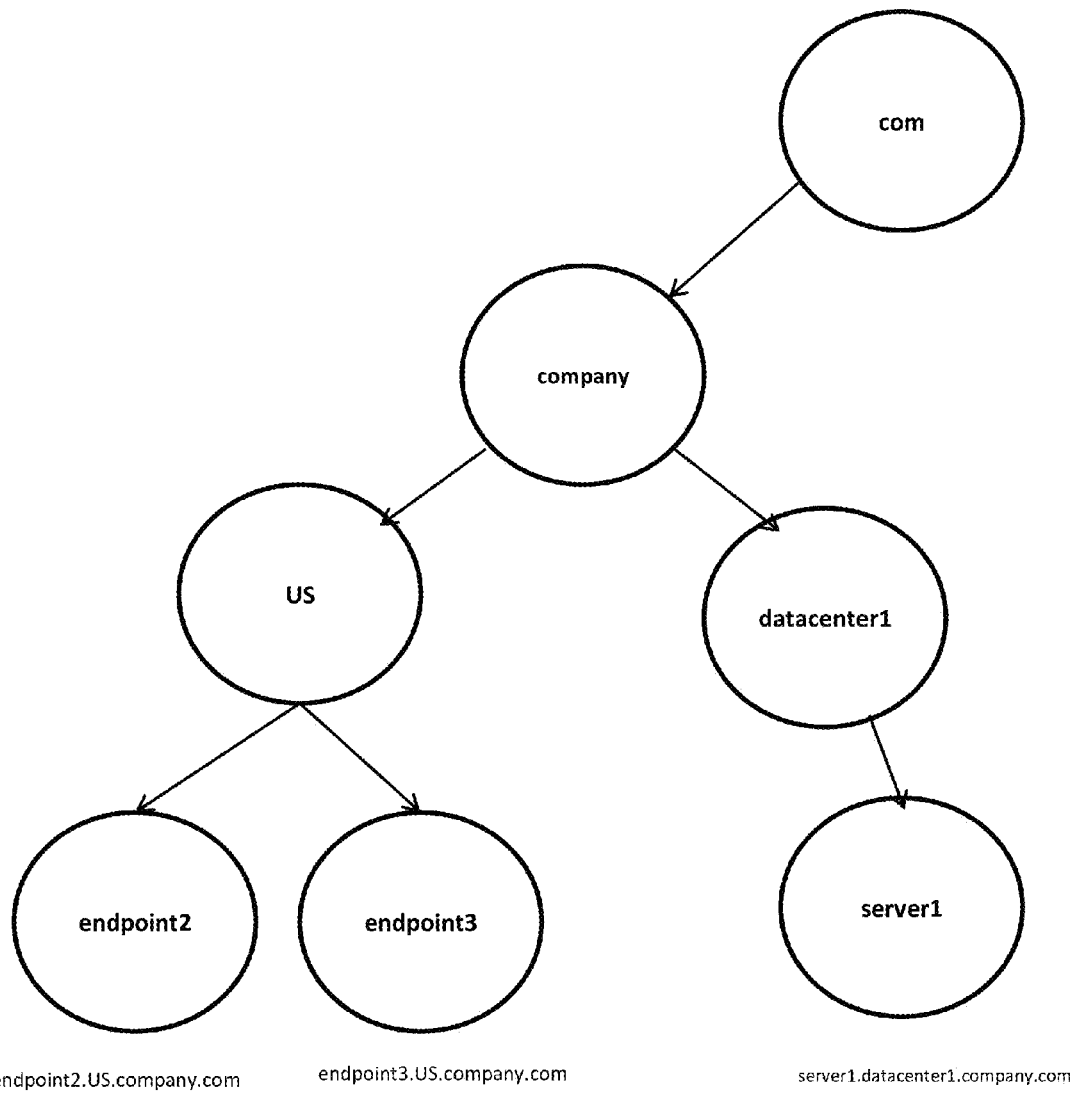
FIG. 3 which shows an address tree parsed from an exemplary group of domain names.

The parsing may be performed symbol by symbol or in groups of symbols (as illustrated in FIGS. 2A-3).

In some embodiments the network addresses are parsed from left to right. In other embodiments the network addresses are parsed from right to left. Optionally the direction of parsing is decided based on the format of the network address. For example, domain names may be parsed from right to left whereas IP addresses may be parsed from left to right.

In some embodiments the network addresses form a single address tree. In other embodiments parsing the list results in multiple disjoint address trees, denoted a forest. Optionally, the forest includes trees with different respective address formats. For example, a forest may contain a first tree in hexadecimal format and a second tree in a domain name format.

FIGS. 2A-2C show exemplary data trees parsed from the group of IP addresses given in Table 1:

TABLE 1

| | | | |
|---|---|---|---|
| 192.168.001.001 | 192.168.003.004 | 192.169.004.001 | 225.160.003.005 |
| 192.168.001.002 | | | 225.160.003.003 |
| 192.168.001.003 | | | |

Reference is now made to FIG. 2A which shows a forest of two trees (210 and 220) formed from the Table 1 addresses. The tree nodes are in decimal form, and proceed digit by digit from the left side of the IP address to the right.

Reference is now made to FIG. 2B which shows a forest of two trees formed from the Table 1 addresses. The tree nodes are in decimal form and leading zeros have been removed from the address. In some embodiments, the period symbols in the IP address are included in the tree. Including the period symbols as nodes in the tree distinguishes between the sections of the IP address, which otherwise may not be detectable after the leading zeros are removed.

Reference is now made to FIG. 2C which shows a forest of two trees formed from the Table 1 addresses. The tree nodes are in hexadecimal form, and proceed digit by digit from the left side of the IP address to the right.

Reference is now made to FIG. 3 which shows a tree parsed from the following domain names:

server1.datacenter1.company.com
endpoint2.US.company.com
endpoint3.US.company.com In FIG. 3, the domain names are parsed in groups of letters and from right to left.

Ripeness

Returning to FIG. 1, in 120 nodes are classified as ripe or unripe. Nodes in the tree structure which represent normal behavior are denoted ripe nodes. Nodes in the tree structure for which not enough data has been received to determine if they represent normal behavior are denoted herein unripe nodes. A network address or portion of a network address represented by an unripe node is not an integral part of the learned model until it ripens.

Optionally, node ripeness is determined as follows. During parsing, new network addresses are added to the model. Each node is considered unripe upon its first occurrence. In order to determine whether a node is ripe, a respective ripeness score is updated for each node while the address list is parsed into the address tree. In some embodiments the ripeness score is calculated from the number of occurrences and/or frequency of occurrence of the given node in the address list used to create the address tree.

In an exemplary embodiment, node ripeness is calculated for an IP address as follows:

Let count be the number of occurrences of the IP
Let time frame be the time frame in which these occurrences take place
   if (count>minOccurrences AND time frame>minTimeframe) then the IP is ripe Anomaly Detection Anomaly detection may begin once a model of normal behavior has been built. The model represented by the address tree or forest is used to detect network addresses indicating anomalous behavior.

Figure 1B:
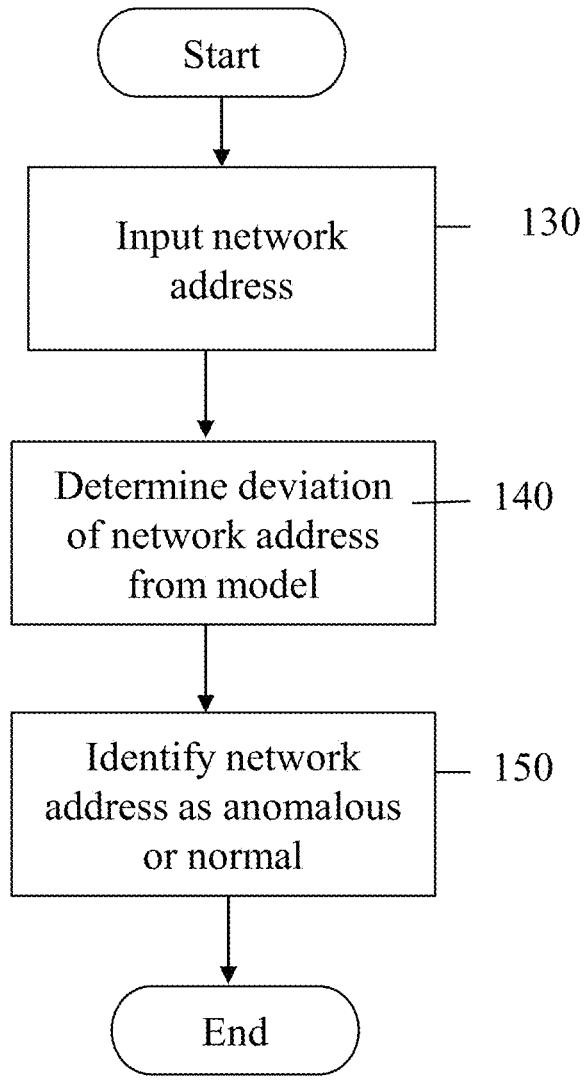
FIG. 1B is a simplified flowchart of a method for identifying anomalous behavior in a network, according to embodiments of the present invention.

FIG. 1B is a simplified flowchart of a method for identifying anomalous behavior in a network, according to embodiments of the present invention.

In 130 a network address is input.

In 140, the deviation of the network address from the data tree model is determined. In some embodiments the deviation is determined as shown in FIG. 1C and/or other embodiments discussed below.

In 150 the network address is identified as anomalous when the deviation is more than a specified deviation. Otherwise the network address is identified as normal.

Figure 1C:
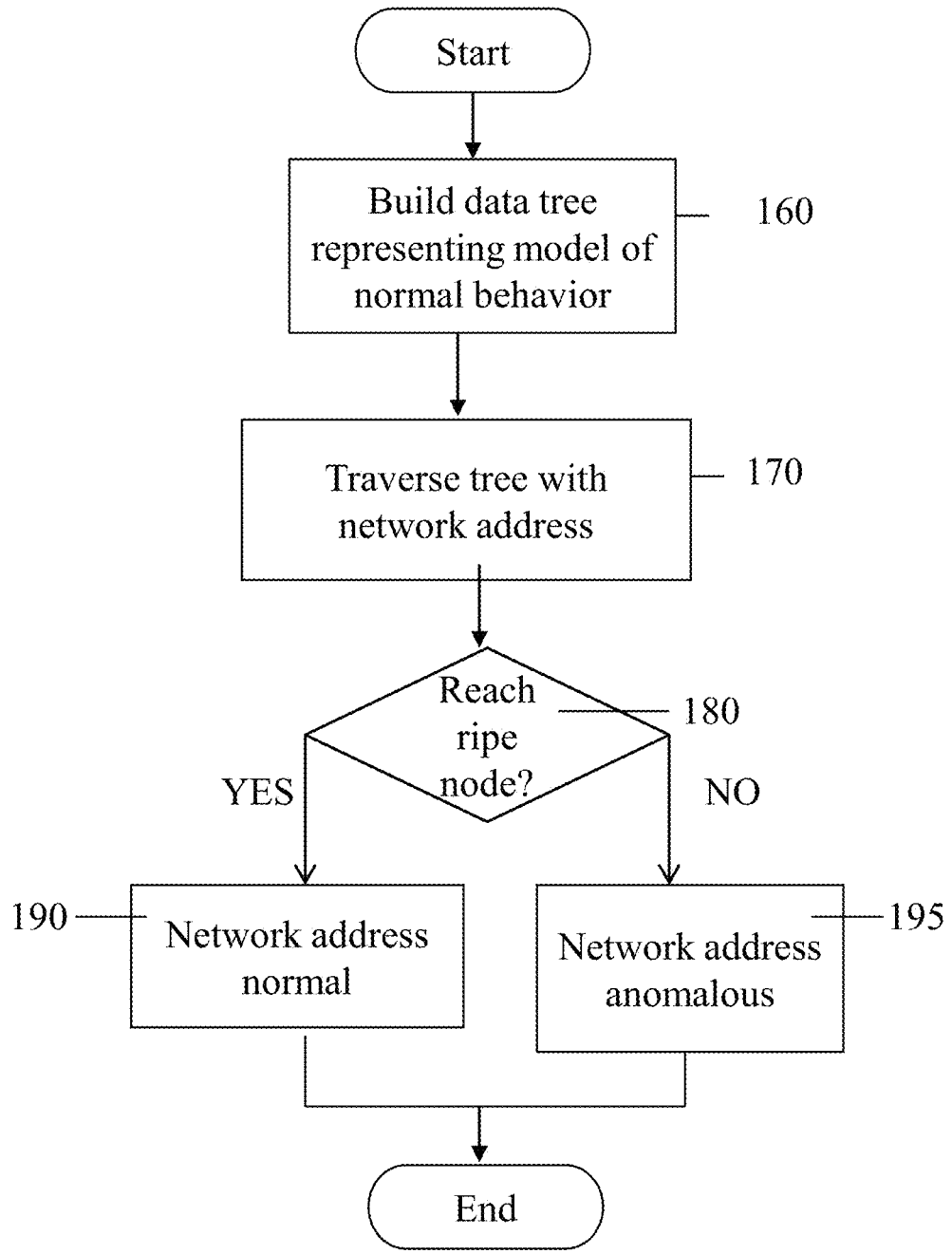
FIG. 1C is a simplified flowchart of a method for identifying anomalous behavior in a network from a network address, according to embodiments of the present invention.

Reference is now made to FIG. 1C which is a simplified flowchart of a method for identifying anomalous behavior in a network, according to embodiments of the present invention.

In 160 the data tree representing normal behavior is built as described herein (e.g. as shown in FIG. 1A).

In 170 a new network address is input and the address tree is traversed with the new network address until a leaf is reached in the tree.

As used herein the term "traversing with a network address tree" means following a path from node to node through the address tree in the order of symbols in the network address.

Traversing starts at the root of the tree and continues along the path until a leaf is reached. The leaf may be a specific IP or a logical leaf. Logical leaves are formed by logically removing descendants of an intermediate node by pruning, as described in more detail below. A logical leaf spans a range of addresses. When a logical leaf is ripe, all descendants of the logical leaf (i.e. all network addresses in the respective range) are considered part of normal behavior.

A network address is spanned by the address tree if the traversing leads to a ripe leaf or ripe logical leaf.

For example consider the forest illustrated in FIG. 2A. If nodes 192.168.001.x and 225.160.003.005 (respectively 210 and 220) are ripe then:

| IP1: | 225.160.003.005 | ⇨ | Normal |
| IP2: | 225.160.003.006 | ⇨ | Anomalous |
| IP3: | 192.168.001.008 | ⇨ | Normal |
| IP4: | 192.168.002.002 | ⇨ | Anomalous |

In 180 an anomaly is detected when the leaf reached by traversing the new network address is unripe or the input network address is not spanned by the address tree. When an anomaly is detected the method proceeds to 195.

In 195 a specified action (or actions) is triggered. Optionally, the triggered action(s) include one or more of:

a) Performing further processing to detect abnormal activity. Optionally the processing is based on a profile which provides further rules and/or data for identifying abnormal activity from the input network address, as described in more detail below;

b) Calculating an abnormality score—The abnormality score is a measure of the proximity of a new address to the normal ranges of the address tree which may reduce false positive identification of abnormal activity, and is described in more detail below;

c) Issuing an alert;

d) Preventing access to the new network address;

e) Preventing access from the new network address; and f) Initiating and/or enforcing a specific workflow.

When anomalous behavior is not detected in 140, the input network address is identified as normal behavior and regular processing continues in 190. Optionally, normal processing includes allowing communication with the input network address.

Maturity

Optionally, an address tree and/or forest are included in the learned model only if it is mature. A respective ripe weight measure is maintained for each node in the tree or forest. A tree or forest is mature when the respective total ripe weight is above a specified threshold.

In an exemplary embodiment, maturity is determined as follows:

$$RipeWeight(node) = \begin{cases} numberOfOccurences, & node \in leaves \\ \sum_{children(node)} RipeWeight(child), & node \in parents \end{cases}$$

A forest is mature: if ($\Sigma_{Forest\ roots} RipeWeight(root) > minForestWeight$)

Similarly, a tree is mature if the sum of ripe weights in the tree is above a specified minimum tree weight.

Figure 4:
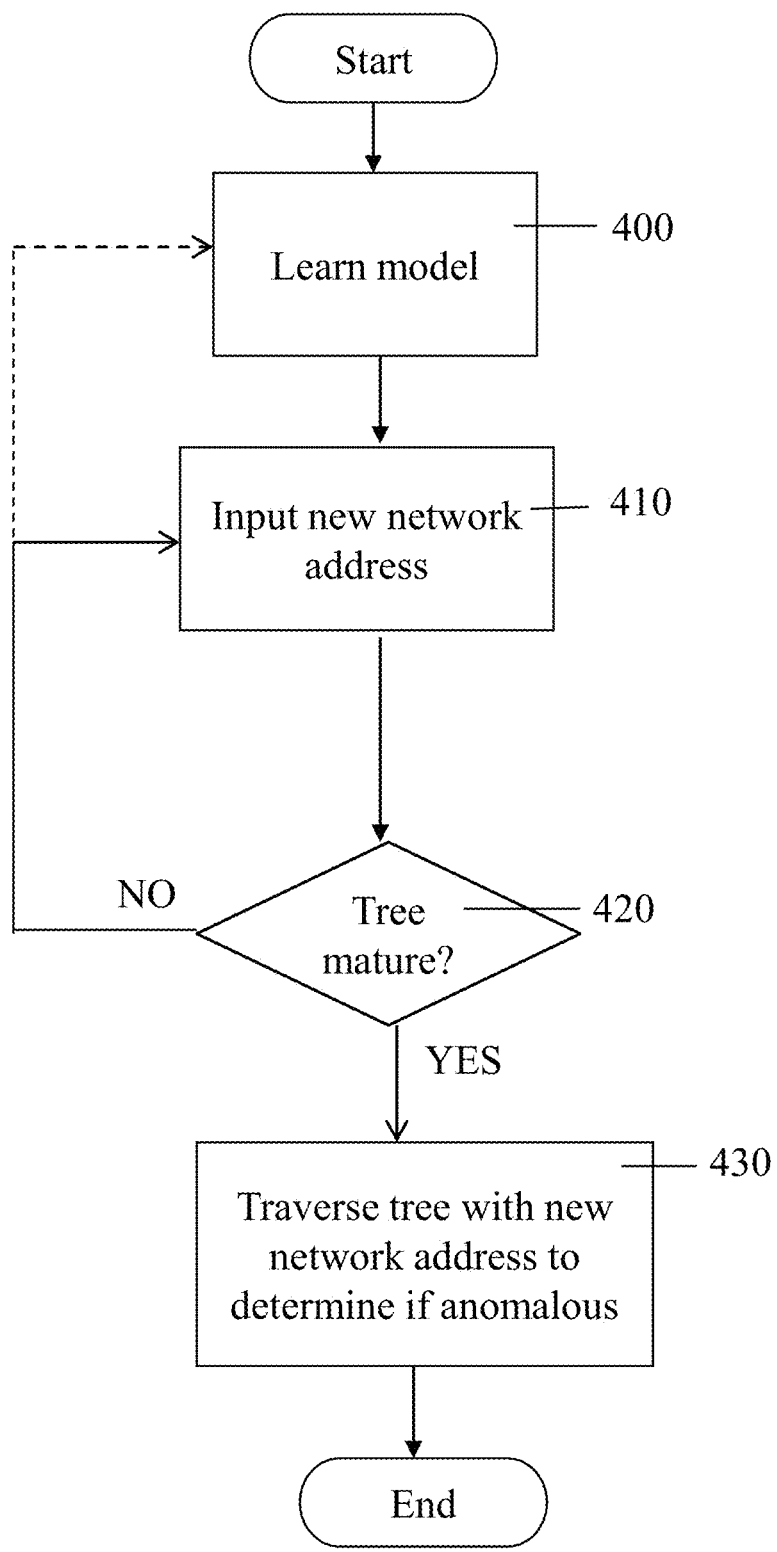
FIG. 4 is a simplified flowchart of a method for identifying anomalous behavior in a network, according to embodiments of the present invention.

Reference is now made to FIG. 4 which is a simplified flowchart of a method for identifying anomalous behavior in a network, according to embodiments of the present invention. In FIG. 4 anomaly detection is performed only if the tree is mature. In 400 the model of normal is learned (corresponding to 100-120 of FIG. 1). A new network address is input in 410. In 420 it is determined whether the tree is mature. When the tree is mature, in 430 anomalous behavior is detected by traversing the mature tree with the new network address (corresponding to 130-160 of FIG. 1). However, anomaly detection is not performed in 430 when the tree is not mature, and network address input continues. Optionally, the model is updated with the new address (see dashed lines in FIG. 4).

Pruning

Optionally, node pruning is performed on the address tree. Common network address prefixes which span a large enough sub-tree are considered an aggregated address range. Pruning logically "removes" descendants of an intermediate node in the address tree. After pruning, the pruned intermediate node spans a range of network addresses and is denoted a logical leaf. All descendants of a ripe logical leaf are considered to be ripe.

Pruning reduces the likelihood of false positive identifications of anomalous behavior. New network addresses do not necessarily trigger an anomaly action when they are part of the range spanned by the logical leaf.

Optionally, node pruning is dependent on a Pruning Threshold. The Pruning Threshold represents the minimum number of children for pruning.

In an exemplary embodiment, the pruning threshold is calculated as follows:

PruningThreshold=[PruningFraction×MaximalNumberOfChildren]

For example, in a decimal base IP representation:

MaximalNumberOfChildren=10

Setting Pruning Fraction=0.2 results in

PruningThreshold=[0.2×10]=2

Thus, a node which has more than 2 children will be considered an IP range, and its children will be pruned.

Range identification may be performed at different tree levels. Optionally, a pruning depth parameter defines the number of levels for pruning to be performed, starting from the leaves.

Table 2 shows the results of pruning a list of IP addresses at pruning depths of one and two:

TABLE 2

| IPs | Pruning Depth = 1 Ranges | Pruning Depth = 2 Range |
|---|---|---|
| 192.168.001.111 | 192.168.001.11x | 192.168.001.1xx |
| 192.168.001.112 | 192.168.001.12x | |
| 192.168.001.121 | | |
| 192.168.001.122 | | |

In some embodiments, the pruning depth may be different for different trees in the forest. This means that for different IP prefixes a different level of range identification may be performed. For example, Pruning Depth may be configured to be higher for IPs inside an organization, and lower for IPs outside an organization. Thus, a different policy may be defined for IP subnets inside and outside an organization.

Figure 5:
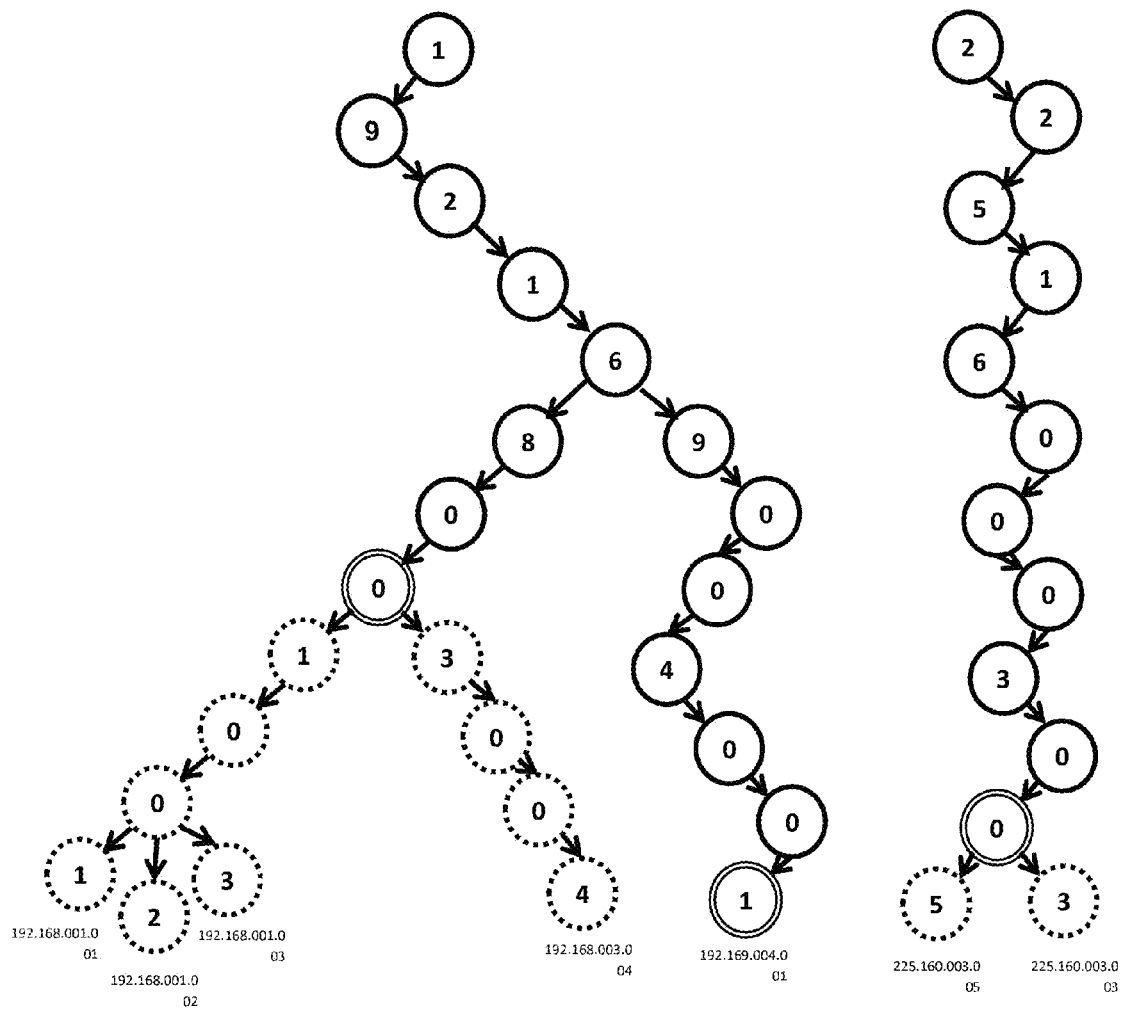
FIG. 5 illustrates pruning in an exemplary address tree.

Reference is now made to FIG. 5 which illustrates pruning in the address tree of FIG. 2A. With a pruning depth of 5, a pruning fraction of 0.2 and a pruning threshold of 2, the pruned IPs are:

TABLE 3

| Pruned IPs | Normal Range |
|---|---|
| 225.160.003.005, 225.160.003.003 | 225.160.003.00x |
| 192.168.001.001, 192.168.001.002, | 192.168.00x.x |
| 192.168.001.003, 192.168.003.004 | |

In FIG. 5 nodes which have been pruned are shown with a dotted outline. The nodes corresponding to prefixes 192.168.00 and 225.160.003.00 are logical leaves.

Profiles

Optionally, profiles are used for anomaly detection. In some embodiments, profiles are representations of learned normal behavior for a given entity or group of entities. When anomalous behavior is detected, the network address and/or an event associated with the network address may be further analyzed in light of a relevant profile or profiles. This may reduce false positives. For example, an event associated with a network address represented by an unripe node on the address tree may be identified by the profile as normal, even though the respective network address has not been traversed the number of times required for the node to ripen.

Profiles may be based on one or more metrics, such as time, date, rate of input, IP or IP range, geographical location, type of events, success/failure indication, input metadata, input content and others. For example, a profile may represent the network addresses used in credential retrieval operations performed by a specific system administrator for a specific target resource, over the course of a typical workday.

Optionally the profile represents information regarding three aspects—the entity or combination of entities for which this profile is relevant, the metrics which this profile represents (time, date, network addresses and others) and the relevancy period for which this profile is valid. The relevancy period may be an ongoing, valid in real-time, or historical, representing entity behavior in some period in time. For example, a profile may represent the IP addresses from which a specific target resource was accessed over the period of the first 3 months of 2013. In another example, a profile may represent the network addresses of servers on which commands were executed by a group of users, over the period of one year and continuing until present time.

Optionally the entity is one or a combination of the following types of entities or a combination of types:

a) A user—The user may be a human, application, client, device, or other human or machine. The user may be the source of a communication session.

b) A target—The target may be a machine, account, application, device, command or other resource. The target may be the destination of a communication session.

c) An action or command. For example, an action may be a command to shut down a Linux server, for which a profile may be built describing the network addresses from which this command was executed in the entire network over the course of one year.

Optionally, the entity is a group of one or several of the aforementioned types. For example, the entity may be a team of system administrators, a group of servers, such as those in a specific data center, or a set of privileged commands. In another example, a profile may describe the IPs from which a system administrator operated over the course of a day. This may include internal organizational network IPs during the day and IPs from home computers during the evening and night. Another profile may describe the network addresses from which commands, such as reboot commands, are performed on a specific machine, such as over a time period, such as one month. This may be of particular importance to a global enterprise, which has support teams in several countries, with several support teams accessing the same servers.

The profiles may also use relevancy periods. Profiles which have been built, and which are being updated cumulatively, may be updated to current system time. They may also be stored profiles for a previous time period. For example, it is possible to describe the network addresses used to access a specific machine over a previous time period, for example, over a three month period of a prior year.

In embodiments herein, anomaly detection is performed with reference to a profile represented as an address tree. The reference profile may be a profile of the same entity corresponding to the action from which the input network address has been generated.

The reference profile may alternatively be a profile of a different entity rather than the entity actually making the action associated with the target resource. For example, this reference profile may be used to analyze input which describes access by a system administrator to a specific Linux server, against the profile of a group of users (such as all the system administrators), or to the profile of an entire organization (enterprise), in accessing all Linux servers. Thus, for example, an anomaly may be detected if the actions of a specific system administrator are different from those of the group to which the system administrator belongs.

An example of using a reference profile is for checking the IP addresses used to run commands by a specific user against the profile for the group to which the user belongs, or against a different group.

Profiles for anomaly detection are also described in U.S. patent application Ser. No. 14/061,835, filed Oct. 24, 2013, entitled: Method and System for Detecting Unauthorized Access to and Use of Network Resources with Targeted Analytics, the disclosure of which is incorporated by reference in its entirety herein.

Updating the Learned Model

Optionally the address tree(s) are updated with new network addresses on a continuous basis and/or periodic basis and/or when a network address is input. Optionally updating includes adding a new network address to the address tree and/or updating respective node data (e.g. ripeness score). Thus, newly encountered addresses may be learned by the ripeness mechanism. False positive rate is reduced due to the dynamic update of the model which learns new normal behaviors.

Optionally, obsolete leaves are removed from the address tree. In some embodiments, a node is obsolete if the number of times the leaf has occurred in a specified period of time is below a required number. Once an obsolete leaf is identified, the leaf and all its ancestors which have a single child are removed.

Optionally, obsolete leaves and their ancestors which have a single child are retained in the data structure but their respective ripeness scores are reset, indicating that the node is no longer ripe. Other respective attributes of the obsolete nodes (e.g. time ranges) may also be changed.

Figure 6:
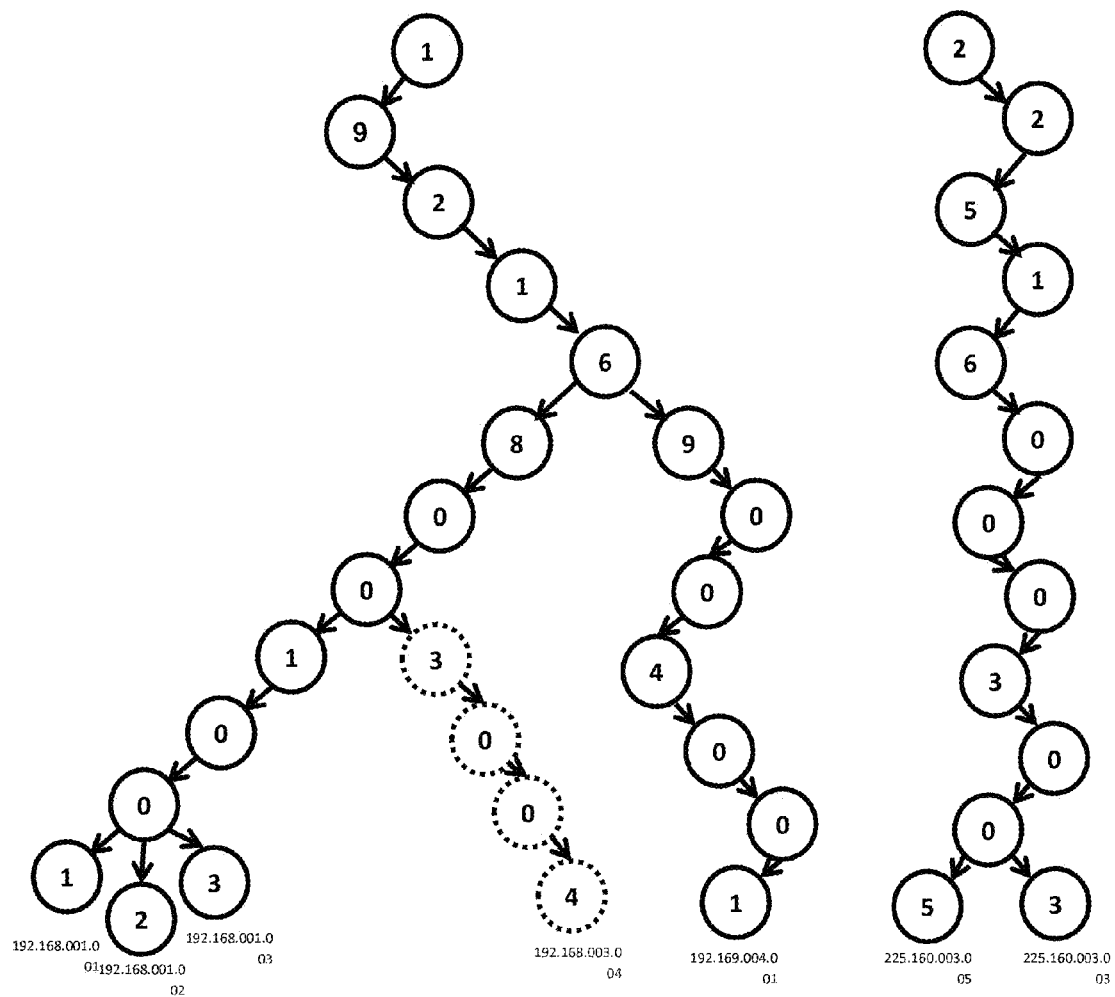
FIG. 6 shows an exemplary address tree with an obsolete node.

Reference is now made to FIG. 6 which shows an example in which IP address 192.168.003.004 is obsolete. All the nodes which are present only in the obsolete IP are removed, as shown by the dashed lines to nodes 3,0,0,4.

In an exemplary embodiment, obsoleteness is determined as follows:
Let time frame be the time frame in which the IP occurrences take place;
Let end denote the end of timeFrame;
Let now denote the current time;
Let minObsoleteDataProportion be a parameter;

$$idleTime = now - end;$$

if $$\left( \frac{timeFrame}{idleTime} < minObsoleteDataProportion \right)$$

then the leaf is obsolete

Abnormality Score

Optionally, when anomalous behavior is detected in 140 an abnormality score is calculated for the new address. Newly encountered addresses which are part of, or proximate to, a normal address range in the model receive a low abnormality score and may be considered normal activity. This may reduce the occurrence of false positive identification of abnormal behavior.

The abnormality score of an IP is a measure which represents the distance of the IP from the normal IP ranges. The abnormality score is denoted herein Score(IP).

$$Score(IP) \in [0,1]$$

In an exemplary embodiment, the abnormality score consists of a weighing of two secondary score functions, the prefix score and the siblings score:

$$Score(IP) = w_1 PrefixScore(IP) + w_2 SiblingsScore(IP)$$

$$w_1 + w_2 = 1$$

The PrefixScore reflects the distance of the given IP from the closest normal range. For example:

| | | |
|---|---|---|
| Normal node: | 192.168.001.x | |
| $IP_1$: | 192.168.002.002, | closest normal range: 192.168.00 |
| $IP_2$: | 192.169.002.002, | closest normal range: 192.16 |
| | | ⇒ PrefixScore($IP_1$) < PrefixScore($IP_2$) |

PrefixScore may be calculated as follows:
Let n be the number of digits in the chosen IP representation
Let CommonPrefixLength be the length of the common prefix of the given IP and the closest normal range
Let TailProportionExpDenominator be a parameter $$UncommonTailLength = n - CommonPrefixLength$$

$$TailProportion = \frac{UncommonTailLength}{n}$$

$$Exponent = \frac{1}{TailProportionExpDenominator}$$

$$TailProportionExp = TailProportion^{Exponent}$$

$$PrefixScore = \log_2(1 + TailProportionExp)$$

As used herein, siblings are the children of the last common node. The SiblingsScore reflects the density of the sub-tree of the last node on the common prefix path. The common prefix path is the path between the nodes which represents the prefix of the given IP which was spanned by the model forest. For example:
  Normal nodes: 192.168.001.x, 192.168.002.x, 192.168.003.x

| | | |
|---|---|---|
| IP1: | 192.168.004.004, | closest normal range: 192.168.00 |
| IP2: | 192.169.001.001, | closest normal range: 192.16 |

192.168.00 has 3 children: 192.168.001, 192.168.002, 192.168.003
192.16 has 1 child: 192.168

⇒ SiblingsScore(IP1) < SiblingsScore(IP2)

The SiblingsScore may be calculated as follows:
Let LastCommonNode be the last node on the common prefix path Let PruningThreshold be the minimum number of children for pruning
Let SiblingsProportionExp be a parameter $$SiblingsProportion = \frac{NumberOfChildren(LastCommonNode)}{PruningThreshold}$$

$$SensitiveSiblingsProportion = SiblingsProportion^{siblingsProportionExp}$$

SiblingsScore=1−SensitiveSiblingsProportion

Narrow and Heavy Trees

Some users tend to use a very small number of network addresses during long periods of time. For example, there are users who log on from a very small number of locations (for example only from the office), and these locations manage network addresses such that these addresses are static (as opposed to DHCP systems).

In these cases, the user behavior may produce a model with a small number of network addresses, with high usage of these addresses. In the model this will result with a tree with very few leaves, with some leaves having a high ripeness score (denoted herein a narrow&heavy tree).

In the case of narrow&heavy trees, it may be desired that the model be more sensitive to anomalous network addresses; an address may have a low prefix score, because it might be from the same network area and the learned addresses. However, when the narrow&heavy tree represents a steady user behavior over a long period of time, a new address is highly anomalous.

Optionally, the abnormality score is raised when a narrow&heavy tree is identified. In the exemplary embodiment presented herein additional calculations are performed both in the learning phase (during which the address tree is generated) and in the detection phase (during which anomalous behavior is detected). It is noted that in cases where the address tree is updated the learning phase and detection phase may overlap, so that both types of calculations are performed in parallel.

A) Learning Phase

Optionally the following calculations are performed for each narrow&heavy tree during the learning phase:
Let heavyLeafMinWeight be the minimal ripe weight for a leaf to be considered heavy
Learn maxTreeWeight as the maximal ripe weight among all trees
Calculate: numOfHeavyLeafs as the number of leafs with: ripe weight>=heavyLeafMinWeight
Calculate heavyLeafsWeight as the sum of the ripe weight of all the heavy leafs
Calculate: treeTotalWeight as the ripe weight of the tree
Calculate:
heavyLeafsWeightProportion=heavyLeafsWeight/treeTotalWeight B) Detection Phase Optionally, during the anomaly detection phase, a final abnormality score is calculated after integrating the common prefix score and the siblings score. In some embodiments the final abnormality score is calculated as follows:
Let narrowTreeMaxHeavyLeafs be the maximal number of heavy leaves for a tree to be considered narrow
Let heavyLeafsWeightProportionMin be the minimal proportion of heavy to non-heavy leaves for a tree to be considered narrow & heavy Raise the score if the tree classifies to the narrow&heavy tree heuristic, as follows:
    if (numOfHeavyLeafs<=narrowTreeMaxHeavyLeafs) AND
(heavyLeafsWeightProportion>=heavyLeafsWeightProportionMin) then:
    double normalized Weight=narrow Tree Weight/maxTreeWeight
    double scoreDiff=1D−score
    scoreDiff=scoreDiff*normalized Weight
    score=score+scoreDiff*scoreDiff
Node Attributes In addition to the ripeness score, nodes optionally have additional respective attributes. The additional attributes may serve as additional parameters used for one or more of: anomaly detection, pruning, address tree updating, indications of triggered activities upon anomaly detection and additional purposes. For example, the node may have a time attribute (e.g. a timestamp) if node ripeness depends not only on the number of occurrences but also on the time frame of the occurrences.

Figure 7A:
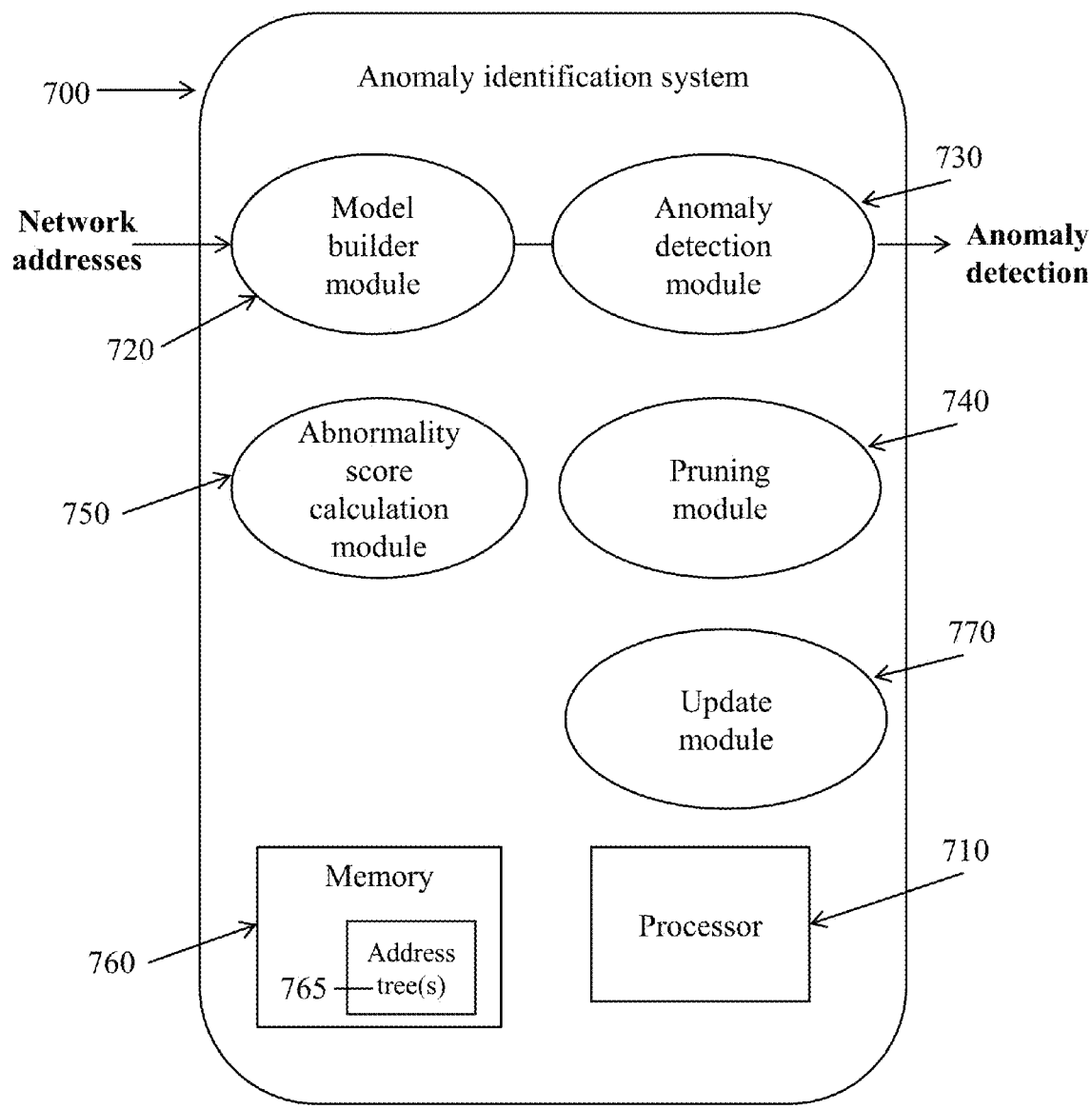
FIG. 7A is a simplified block diagram of a system for identifying anomalies in a group of network addresses, according to embodiments of the invention.

Reference is now made to FIG. 7A which is a simplified block diagram of a system for identifying anomalies in a group of network addresses, according to embodiments of the invention. Anomaly identification system 700 includes one or more processor(s) 710. Anomaly identification system executes one or more modules, including model builder module 710 and anomaly detection module 730. Optionally, anomaly identification system 700 further includes pruning module 740 and/or abnormality score calculation module 750.

Optionally, anomaly identification system 700 includes memory 760 which stores one or more address trees 765. One or more of the stored address trees may be associated with a respective entity, as described above.

Model Builder Module

Model builder module 720 builds the address tree (or trees) which models a group of network addresses, substantially as described above (e.g. see FIG. 1A). Model builder module 720 inputs a group of network addresses, and parses the network addresses into at least one address tree. While the network addresses are being parsed, model builder module 720 assigns a respective ripeness score to each of the nodes, classifies nodes as ripe or unripe based on the node's current ripeness score.

Optionally, model builder module 720 determines when an address tree is mature, which enables anomaly detection module 730 to decide whether anomaly detection may or may not be performed with a given address tree.

Optionally, model builder module 720 updates the address tree as needed (e.g. continuously, periodically and/or upon request).

Optionally, model builder 720 determines when nodes are obsolete, and removes obsolete nodes from the address tree.

Anomaly Detection Module

When at least one address tree is mature, anomaly detection may be performed by anomaly detection module 730, substantially as described above (e.g. see FIG. 1B). Anomaly detection module 730 inputs a network address and identifies a network address as anomalous or normal based on a deviation of the network address from the model.

Optionally anomaly detection module 730 performs anomaly detection by traversing the appropriate address tree the network address. For example, memory 760 may contain multiple address trees which span the network address being checked, and the appropriate tree for traversal is determined by the entity associated with the network address being checked. Anomaly detection module 730 classifies the network address as normal when the final node arrived at after traversing the tree is ripe, and as anomalous when the final node unripe node or outside the address tree.

Optionally, anomaly detection module 730 triggers an alert when an anomalous network address is identified.

Pruning Module

Optionally, anomaly identification system 700 further includes pruning module 740. Pruning module 740 prunes intermediate nodes by logically removing a node's descendants of the from the address tree. The pruned node spans a sub-range of network addresses in the tree data structure and becomes a logical leaf.

Optionally, anomaly identification system 700 further includes abnormality score calculation module 750. Abnormality score calculation module 750 calculates an abnormality score when an anomalous network address is identified. The abnormality score is a measure of a deviation of the anomalous network address from the model built by model builder module 720. When the abnormality score is within a specified range abnormality score calculation module 750 reclassifies the identified anomalous network address as normal.

Update Module

Optionally, anomaly identification system 700 further includes update module 770. Update module 770 updates the tree data structure with a specified network address, for example when anomaly detection module 730 inputs a network address.

When the tree data structure includes a node representing the specified network address, the respective ripeness scores of nodes traversed through the tree data structure to the node representing the specified network address is incremented.

When the specified network address is outside the tree data structure, a node representing the specified address is added to the tree data structure. The added node's respective ripeness score is initialized, and the respective ripeness scores of nodes traversed through the tree data structure to the added node are incremented.

Figure 7B:
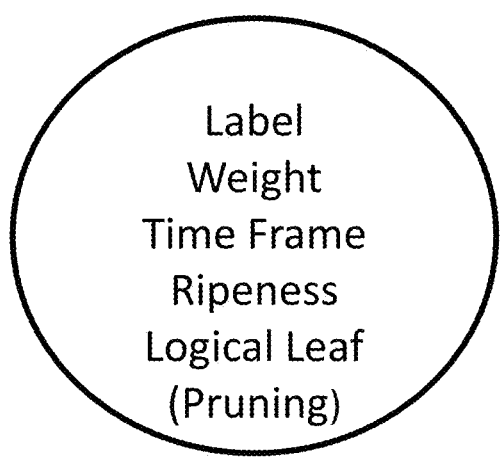
FIG. 7B shows an exemplary node data structure with respective attributes.

Reference is now made to FIG. 7B, which shows an exemplary node data structure having respective attributes according to embodiments of the instant invention. The exemplary node has the following attributes:

Label—The network address component represented by the node. In the case of IP address example, the label is the IP digit;

Weight—The number of occurrences of the network address represented by the path from the root to the node;

Time Frame—The time frame in which the network address represented by the path to the node was observed;

Ripeness—An indication of the ripeness of the node. The ripeness attribute may be a function of the node weight and/or time frame; and Logical Leaf—An indication of the pruning of the node. If the children of the node were pruned, the node is a logical leaf.

In an exemplary embodiment, each node in the address tree is a structure/class, as shown below:

| Label | string | |
|---|---|---|
| isRipe | boolean | // TRUE if the node is ripe |
| timeframe | timeframe | // time frame of this node's activity |
| Weight | integer | // weight of sub-tree |
| ripeWeight | integer | // weight of ripe sub-tree |
| isLogicalLeaf | Boolean | // TRUE if the sub-tree of node is pruned |
| children | list of pointers | |

Figure 8A:
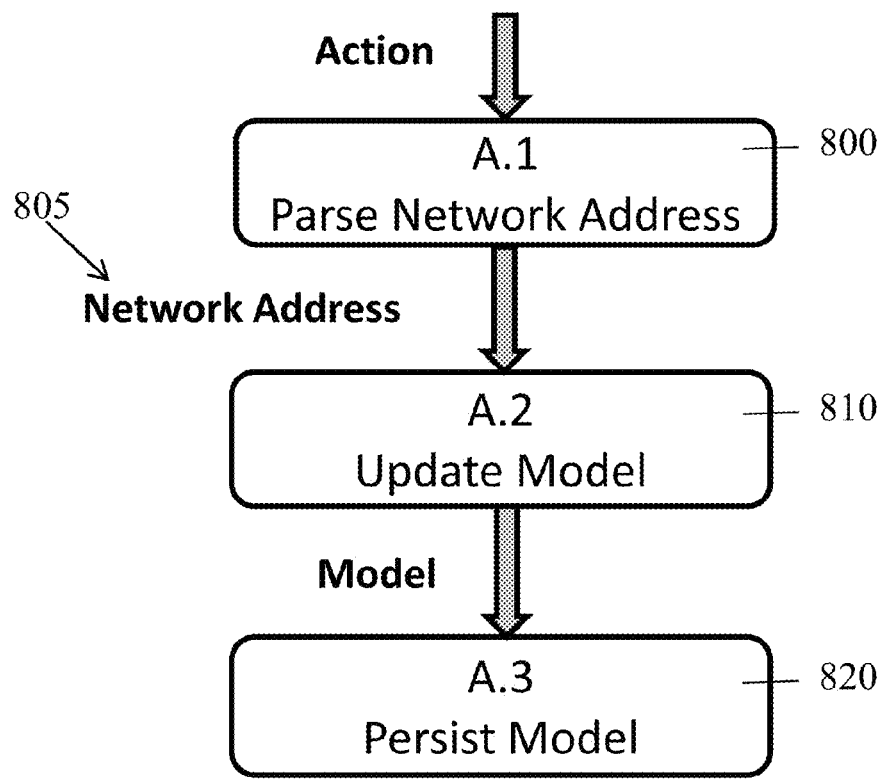
FIG. 8A is a simplified flowchart of a method for learning and updating a model of normal behavior, according to embodiments of the invention.

Reference is now made to FIG. 8A which is a simplified flowchart of a method for learning and updating a model of normal behavior, according to embodiments of the invention.

In 800 (A.1) network addresses are parsed into one or more address tree(s). When a new network address 805 is received the model is updated in 810 (A.2) by traversing the address tree with network address 805, as described for embodiments herein. In 820 (A.3) the model persists until another network address is received. In some embodiments, in 820 (A.3) obsolete nodes are removed from the address tree.

Figure 8B:
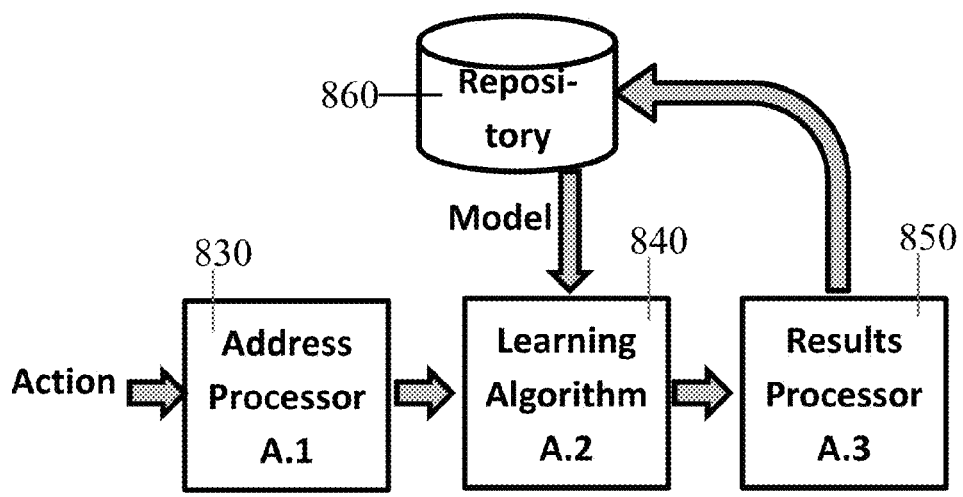
FIG. 8B is a simplified block diagram of an apparatus for learning a model of normal behavior, according to embodiments of the invention.

Reference is now made to FIG. 8B which is a simplified block diagram of an apparatus for learning a model of normal behavior, according to embodiments of the invention. Embodiments of the apparatus of FIG. 8B may serve to implement the method of FIG. 8A.

In A.1 one or more network addresses are input into address processor 830. Address processor 830 parses the input network addresses. In A.2, learning algorithm 840 generates a new address tree or forest and/or updates an existing tree or forest. In A.3 the address tree or forest may undergo further processing by results processor 850. The address tree and/or forest are stored in repository 860.

Figure 9A:
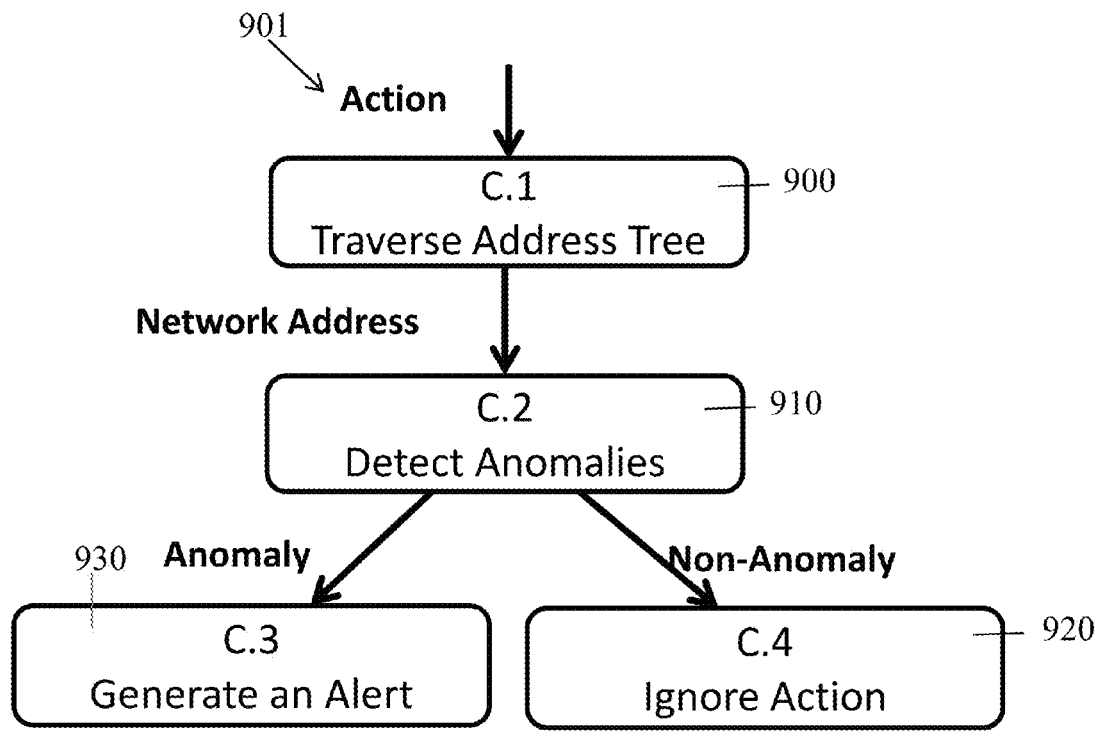
FIG. 9A is a simplified flowchart of a method for detecting anomalous behavior utilizing a network address tree, according to embodiments of the invention.

Reference is now made to FIG. 9A which is a simplified flowchart for detecting anomalous behavior utilizing a network address tree according to embodiments of the invention.

In 900 (C.1) a network address associated with action 901 (i.e. event) is input and the address tree is traversed with the input network address. In 910 (C.2) the result of the traversing is analyzed to detect anomalies. When an anomaly is not detected, in 920 (C.2) the action is ignored and processing continues. When an anomaly is detected, in 930 (C.3) an alert is generated.

Figure 9B:
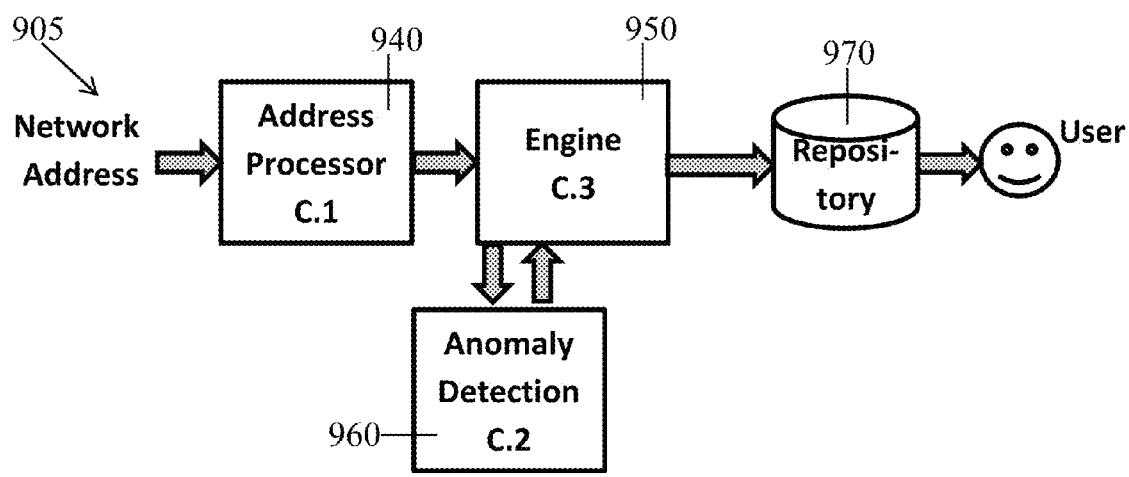
FIG. 9B is a simplified block diagram of an apparatus for detecting anomalous behavior utilizing with a network address tree, according to embodiments of the invention.

Reference is now made to FIG. 9B which is a simplified block diagram of a corresponding apparatus for detecting anomalous behavior utilizing a network address tree, according to embodiments of the invention. Embodiments of the apparatus of FIG. 9B may serve to implement the method of FIG. 9A.

In C.1 a new network address 905 is input into address processor 940. It is desired to determine whether the new network address is or is not anomalous. Engine 950 then retrieves the relevant address tree model and begins anomaly detection 960 to test the deviation of network address 805 from the relevant address tree model. In C.2 the new network address is used to traverse the address tree in order to determine if the new address leads to a ripe leaf or logical leaf and is therefore considered normal. The results of Anomaly Detection C.2 are returned to Engine 950. If the new network address is considered normal, normal processing continues at C.4. Otherwise, the new network address is anomalous, and special processing is performed in C.3 by Engine 950 (for example generating an alert). The results of the detection process may be stored in repository 970.

Anomaly detection is useful in many fields, examples of which are described below.

Security Analytics

Security analytics aims to discover behaviors and anomalies which may indicate a security threat to an organization. The premise is that attackers attempt to hide their actions and conduct malicious activity while impersonating legitimate users or disguising their actions as legitimate actions. Embodiments herein may analyze an aspect of network activity, specifically the network addresses that are used in the network, in order to learn normal behavior patterns.

Departures from the normal behavior patterns may and indicate anomalies. For example, an attacker impersonating a legitimate user may use the legitimate user's credentials, while operating from a machine (e.g. identified by the source network address) that the legitimate user has never used before. The learned model identifies the legitimate user's access from the new machine as an anomaly. Such anomalies may indicate malicious actions on the network, serving to provide alerts and assist in detecting and preventing attackers from reaching their goals.

Another aspect of security analytics is detecting insider threats. For this, an organization may use embodiments herein to check specific user actions against the actions of a respective user group or even of the entire organization in order to detect anomalies. For example, an alert may be triggered when a specific system administrator connects to a machine that no other system administrator in the organization connects to.

Network Optimization

Embodiments herein may be used for network optimization. An organization may identify a machine with anomalous access when compared to access to other machines in the network or in its relative network segment. As a result of such detection, the organization may decide to move the machine to a different network segment, thus simplifying routing and access workflows.

User Behavior Study

Embodiments herein may be used for discovering anomalies in user behavior. For example, an employer may monitor the actions of employees to detect a user who accesses resources that are not accessed by other users. Another example is a web server that examines the source addresses of the users that access it and detects users that are accessing the web server from anomalous locations. Such users may be provided with different content or different workflow than other users accessing the web server from known or normal addresses.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant network addresses, network address formats, tree data structures, tree data structure parsing and tree data structure traversing will be developed and the scope of the terms network address, network address format, tree data structure, parsing and traversing is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for identifying anomalies in a group of network addresses, comprising:
   inputting, with a data processor, a plurality of network addresses;
   parsing said plurality of network addresses, with said data processor, into at least one tree data structure, each tree data structure comprising a plurality of nodes wherein successive nodes in said tree data structure represent successive portions of said network addresses;
   during said parsing, assigning a respective ripeness score to each of said nodes, said respective ripeness score indicating a number of occurrences of each of said nodes in said plurality of network addresses;
   building a model of normal behavior from tree data structure nodes assigned respective ripeness scores within a specified range of ripeness scores and excluding from said tree data structure nodes with assigned respective ripeness score outside said specified range; and
   for an input network address:
   traversing said model of network behavior along said input network address;
   identifying whether said input network address is anomalous based on a deviation of said network address from said traversed model, said deviation being zero when said traversing said model of network behavior along said input network address leads to a leaf node;
   when an anomalous network address is identified, calculating an abnormality score indicating said deviation of said anomalous network address from said model and reclassifying said anomalous network address as normal when said abnormality score is below a specified level; and
   when said tree data structure comprises less than specified number of leaves and at least some of said leaves have respective ripeness scores greater than a specified ripeness score, recalculating said abnormality score for said identified anomalous network address.

2. A method according to claim 1, further comprising identifying said input network address as anomalous when said input network address is incompletely traversed inside said model.

3. A method according to claim 1, wherein said input network address is associated with at least one of: a network event and an entity.

4. A method according to claim 1, wherein said plurality of network addresses is ordered and said parsing is performed in said order.

5. A method according to claim 1, wherein each of said network addresses has a respective timestamp.

6. A method according to claim 1, further comprising triggering an alert when an anomalous network address is identified.

7. A method according to claim 1, wherein said respective ripeness score is further a function of a frequency of occurrence of said node during a specified time range.

8. A method according to claim 1, further comprising pruning an intermediate node by logically removing descendants of said intermediate node from said tree data structure, such that pruned node spans a sub-range of network addresses in said tree data structure, such that said pruned node becomes a leaf node in said tree data structure.

9. A method according to claim 8, wherein said intermediate node is pruned in accordance with at least one of: a number of descendants of said intermediate node and a depth of said intermediate node in said tree data structure.

10. A method according to claim 1, wherein said network addresses are associated with an entity such that said tree data structure models normal behavior for said entity, and wherein said entity comprises at least one of: a user, an application, a client, a device, a target machine, an account and a command.

11. A method according to claim 1, wherein at least one network address in said plurality of network addresses is input from one of a group comprising: an agent monitoring user activity, a network element monitoring communication within said network and a list of network addresses.

12. A method according to claim 1, further comprising classifying a tree data structure as a mature tree when said tree data structure comprises at least a specified number of nodes with a respective ripeness score within said specified range of ripeness scores, wherein said identifying whether said input network address is anomalous is performed only on mature trees.

13. A method according to claim 1, further comprising updating said tree data structure with said specified network address by:
   when said tree data structure comprises anode representing said specified network address, incrementing respective ripeness scores of nodes traversed through said tree data structure to said node representing said specified network address; and
   when said specified network address is outside said tree data structure, adding anode representing said specified address to said tree data structure, initializing a respective ripeness score of said added node and incrementing respective ripeness scores of nodes traversed through said tree data structure to said added node.

14. A method according to claim 1, further comprising removing one of said network addresses from said tree data structure when a respective number of occurrences of said removed network address over a specified time period is less than a specified minimum number of occurrences.

15. A method according to claim 1, wherein each of said network addresses comprises an ordered sequence of symbols having a respective type, and a direction of said parsing is in accordance with said respective type.

16. A method according to claim 1, wherein said specified network address is one of: a destination of a data communication session and a sender of a data communication session.

17. A system for identifying anomalies in a group of network addresses, comprising:
a non-transient computer-readable storage medium storing code instructions; and
a processor coupled to said storage medium and adapted to execute the stored code, the code comprising:
instructions for inputting a plurality of network addresses;
instructions for parsing a plurality of network addresses into at least one data structure, each tree data structure comprising a plurality of nodes wherein successive nodes in said tree data structure represent successive portions of the network address;
instructions for, during said parsing, assigning a respective ripeness score to each of said nodes, said respective ripeness score indicating a number of occurrences of each of said nodes in said plurality of network addresses;
instructions for building a model of normal behavior from tree data structure nodes assigned respective ripeness scores within a specified range of ripeness scores and excluding from said tree data structure nodes with assigned respective ripeness score outside said specified range;
instructions for traversing said model of network behavior along an input network address;
instructions for identifying whether said input network address is anomalous normal based on a deviation of said network address from said traversed model, said deviation being zero when said traversing said model of network behavior along said input network address leads to a leaf node;
instructions for, when an anomalous network address is identified, calculating an abnormality score indicating said deviation of said anomalous network address from said model, and reclassifying said anomalous network address as normal when said abnormality score is below a specified level; and
instructions for, when said tree data structure corn rises less than specified number of leaves and at least some of said leaves have respective ripeness scores greater than a specified ripeness score, recalculating said abnormality score for said identified anomalous network address.

18. A system according to claim 17, wherein said processor is further adapted to execute code instructions for identifying said input network address as anomalous when said input network address is incompletely traversed inside said model.

19. A system according to claim 17, wherein said processor is further adapted to execute code instructions for triggering an alert when said anomalous network address is identified.

20. A system according to claim 17, wherein processor is further adapted to execute code instructions for pruning an intermediate node by logically removing descendants of said intermediate node from said tree data structure, such that pruned node spans a sub-range of network addresses in said tree data structure, such that said pruned node becomes a leaf node in said tree data structure.

21. A system according to claim 17, wherein processor is further adapted to execute code instructions for updating said tree data structure with said specified network address by:
when said tree data structure comprises a node representing said specified network address, incrementing respective ripeness scores of nodes traversed through said tree data structure to said node representing said specified network address; and
when said specified network address is outside said tree data structure, adding anode representing said specified address to said tree data structure, initializing a respective ripeness score of said added node, and incrementing respective ripeness scores of nodes traversed through said tree data structure to said added node.

22. A computer program product for identifying anomalies in a group of network addresses, the computer program product comprising a non-transitory computer readable storage medium having program instructions embodied therewith, the program instructions executable by a data processor to cause the processor to:
input, with a data processor, a plurality of network addresses;
parse said plurality of network addresses into at least one tree data structure, each tree data structure comprising a plurality of nodes wherein successive nodes in said tree data structure represent successive portions of said network addresses;
assign a respective ripeness score to each of said nodes during said parsing, said respective ripeness score indicating a number of occurrences of each of said nodes in said plurality network addresses:
build a model of normal behavior from tree data structure nodes assigned respective ripeness scores within a specified range of ripeness scores and excluding from said tree data structure nodes with assigned respective ripeness scores outside said specified range;
for an input network address:
traverse said model of network behavior along said input network address; and
identify, with said data processor, whether said input network address is anomalous based on a deviation of said network address from said traversed model, said deviation being zero when said traversing said model of network behavior along said input network address leads to a leaf node;
calculate, when an anomalous network address is identified, an abnormality score indicating a deviation of anomalous network address from had model and reclassify said anomalous network address as normal when said abnormality score is below a specified level; and
when said tree data structure comprises less than specified number of leaves and at least some of said leaves have respective ripeness scores greater than a specified ripeness score, recalculate said abnormality score for said identified anomalous network address.

23. A computer program product according to claim 22, comprising further program instructions executable by said data processor to identify, with said data processor, said input network address as anomalous when said input network address is incompletely traversed inside said model.

* * * * *